Nov. 15, 1932.  J. D. MARSH  1,887,771
ANT JAR
Filed May 5, 1931
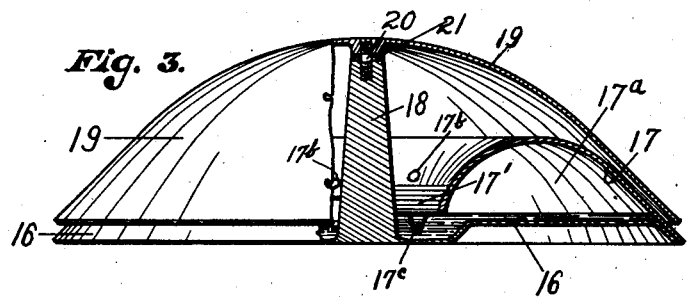
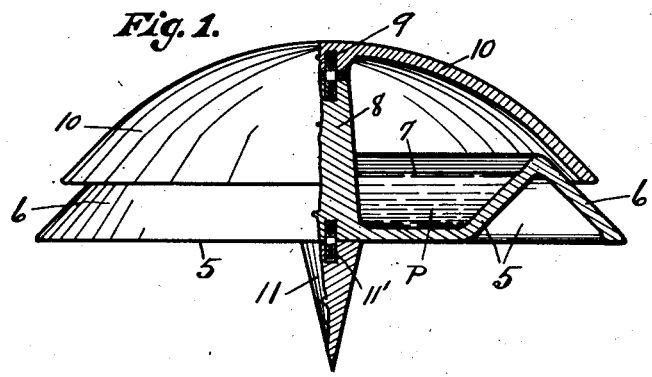
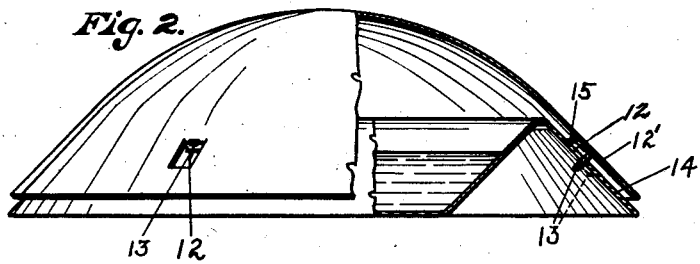
John D. Marsh, Inventor
By [signature], Attorney Patented Nov. 15, 1932

1,887,771

UNITED STATES PATENT OFFICE

JOHN D. MARSH, OF LOS ANGELES, CALIFORNIA, ASSIGNOR OF ONE-HALF TO DON A. HENDERSON, OF LOS ANGELES, CALIFORNIA

ANT JAR

Application filed May 5, 1931. Serial No. 535,123.

My invention relates to ant jars, and more particularly to an improved ant jar which will safely hold the poison and yet which cannot be readily overturned, and if it is overturned will still retain the poison therein and prevent its loss, or its exposure to other animals or children.

Among the salient objects of my invention are: too provide an ant jar of such shape that it cannot be readily upset; to provide an ant jar of such interior construction and arrangement that if it should be accidently upset, or if it should be picked up by little children and turned over, the contents will not run out but will be retained therein, whether the jar is upright, upside down, or even on its edge; to provide an ant jar which has an inclined entrance way for the ants to enter, which entrance way is shaded with an overlying cover or dome portion, thus providing a sheltered, inclined run way for the ants to use in entering the chamber of the jar where the poison is retained; to provide means for anchoring the ant jar to the ground to prevent its accidental misplacement and to make it difficult for children to pick it up; to provide means for regulating the vertical height of the entrance way so that it can be adjusted to prevent other than ants, or insects as small, from entering the jar, and, in general, to provide an improved, practical and safe ant jar for holding poison for ants, and yet making that poison inaccessible for other animals of larger size, or for children.

In order that others may fully understand my invention, I have shown certain embodiments thereof, which I will now describe.

Figure 1 is a side elevation, partly in section, of an ant jar embodying my invention;

Figure 2 is a similar view of a modified form or embodiment thereof; and

Figure 3 is a similar view of a still further embodiment of my invention.

Referring first to Fig. 1, 5 designates a base or body, having an annular inclined runway or entrance way 6, leading up into the chamber 7, where the poison is placed, said poison being designated P. The upper part of the chamber wall is shown as roughened to facilitate the approach to the poison by the ant.

In the center of said chamber is a column or standard 8, adapted at its upper end to have attached thereto by means of a screw connection 9, a cover 10, of dome form, adapted to overlie the inclined entrance way 6, to any extent desired, and so as to provide a shaded or covered runway into the chamber of the device. By using one or more washers at the connection 9, it will be seen that the cover can be raised or lowered so as to regulate or change the height of the entrance to the jar, and it can be set for ants or even for larger insects, as may be desired. Other means can be used to make possible this adjustment.

I have also provided a prong 11, with means for attaching it to the underside of the base or body 5, as by means of a threaded connection 11', which can be used to anchor said device to the ground when so desired.

In Fig. 2, I have provided an embodiment of my invention stamped out of sheet metal with interlocking means similar to a bayonet slot for securing the parts together, said slot being designated 12 and the struck out finger being designated 13, with a spacing member 15 struck up out of the base in the manner indicated, said spacing member supporting the dome cover and also bearing against the inturned finger 13, as clearly shown. If said finger is bent over, as indicated in light broken lines, it will be seen that said base and dome are interlocked together, with the shaded runway 14 for the ants to enter said chamber.

In Fig. 3, I have shown a still further and practical embodiment of my invention, and in this form of the invention I have provided the base 16, with an overlying, annular dome-like member 17, secured around its outer edge to the edge of the base in any suitable manner, and with its open center inturned around the center standard 18, which supports the cover or dome 19, with screw means 20, and with the washers 21, as in the embodiment shown in Fig. 1. The poison is placed in the base to a height which will enable the ants to reach it from the lower edge of the inturned central part of the member 17, which can be made rough in any desired manner to facilitate the approach to the poison by the ant, as indicated at 17'. It will be clear from this showing that in case the device is overturned, or even held edgewise, that the contents will run into the chamber 17ᵃ, formed around the dome-like member 17, which is of such capacity as will hold all the poison, and if overturned, any poison which might run over into the dome of the cover 19, would be retained therein, and not escape. In order to facilitate the flow of the contents into the chamber 17ᵃ and the escape of the air therefrom, I have shown air vents, as 17ᵇ in the central part of said member 17, and I have also shown prong extension 17ᶜ from the lower edge of the inturned central part of said dome-like member 17. This is to provide means for the ants to move down to the poison when it gets below the edge of said member. Any number of these prongs can be formed on the inturned central part of said member 17, to extend down into the poison.

It will thus be seen that I have provided a novel form of device of this general character which is water proof, that is, water from a sprinkler, or rain will not enter the chamber. The device is not easy to overturn, and is not easy to pick up in the hand because of its smooth shape. The dome cover will hold the contents of the base chamber, if the device is turned over, and in the embodiment of the invention shown in Fig. 3, the base has a retaining chamber sufficient to hold the contents and prevent it running out, even if the device be picked up and held in an edgewise position.

While I have shown and described certain embodiments of my invention, I am aware that changes in the details can be made without departing from the spirit thereof, and I do not, therefore, limit the invention to the showing made, except as I may be limited by the hereto appended claims.

I claim:

1. An ant jar to contain poison and consisting of a base with a central chamber for the poison, said base having an upwardly and inwardly inclined runway which runway also inclines downwardly and inwardly to the poison, whereby the ant can run up and over and down to the poison and then return, and a dome supported over said base and said runway to shelter said runway and protect said poison.

2. An ant jar to contain poison and consisting of a base with a central chamber for the poison, said base having an upwardly and inwardly inclined annular runway, said runway also extending inwardly and downwardly to the poison around the inside of the annular runway, whereby the ants can run upwardly on said runway and inwardly and downwardly thereon to the level of the poison around said base, and a dome member supported over said annular base to shelter said chamber and said runway, and to direct the fumes from the poison downwardly between the underside of the dome and said runway.

3. An ant jar of the character referred to and consisting of an annular base having a central chamber for the poison and surrounded by an annular portion formed to provide an upwardly and inwardly inclined runway and also extended downwardly into said chamber and within reach of the poison, whereby the ant can run up over the top part of said annular member and down to within reach of the poison in said chamber, and a dome cover supported centrally over said annular base and overlying said runway, whereby to provide a shelter over said runway and over said chamber, said dome being formed to hold the contents of said jar if overturned.

4. An ant jar consisting of a base having a chamber formed therein and surrounded by an annular part of said base extending upwardly and inwardly and downwardly, in cross section, to the poison in said chamber, whereby ants can run upwardly over the top of said annular part and downwardly into the jar to the poison and return, and a dome cover supported over said chamber and said annular part, to shelter said runway into said jar, said jar having means for holding the contents of the chamber if overturned, whereby to avoid the escape of the poison.

Signed at Los Angeles, Los Angeles County, California, this 27th day of March, 1931.

JOHN D. MARSH.